(12) United States Patent
Maguire

(10) Patent No.: US 8,067,048 B2
(45) Date of Patent: Nov. 29, 2011

(54) METHOD AND APPARATUS FOR COOKING LOW FAT FRENCH FRIES

(76) Inventor: James Edward Maguire, Epping (AU)

( * ) Notice: Subject to any disclaimer, the term of this patent is extended or adjusted under 35 U.S.C. 154(b) by 33 days.

(21) Appl. No.: 12/819,283

(22) Filed: Jun. 21, 2010

(65) Prior Publication Data

US 2010/0251903 A1 Oct. 7, 2010

Related U.S. Application Data

(60) Division of application No. 11/939,811, filed on Nov. 14, 2007, now Pat. No. 7,794,765, which is a continuation-in-part of application No. 10/349,278, filed on Jan. 20, 2003, now abandoned.

(51) Int. Cl.
*A47J 37/04* (2006.01)

(52) U.S. Cl. .......... 426/312; 426/510; 426/523; 99/328; 99/329 P; 99/330; 99/333; 99/335; 99/338; 99/421 R; 99/468; 99/475; 99/479

(58) Field of Classification Search ............ 99/325–335, 99/337–338, 342, 419, 421 R, 468, 473–479; 426/312, 523, 510
See application file for complete search history.

(56) References Cited

U.S. PATENT DOCUMENTS

| | | | |
|---|---|---|---|
| 2,611,705 A | 9/1952 | Hendel | |
| 3,328,172 A * | 6/1967 | Smith, Jr. | 426/467 |
| 3,436,229 A | 4/1969 | Simpson | |
| 3,694,925 A | 10/1972 | Coyle et al. | |
| 3,773,527 A | 11/1973 | Ruggerone | |
| 3,818,818 A * | 6/1974 | Hice, Sr. | 99/330 |
| 4,162,381 A | 7/1979 | Buck | |
| 4,311,895 A | 1/1982 | Tanabe | |
| 4,338,911 A | 7/1982 | Smith | |
| 4,366,177 A | 12/1982 | Wells et al. | |
| 4,531,306 A | 7/1985 | Erickson | |
| 4,537,786 A | 8/1985 | Bernard | |
| 4,587,393 A | 5/1986 | Ueda | |
| 4,721,625 A | 1/1988 | Lee et al. | |
| 4,933,199 A | 6/1990 | Neel et al. | |
| 4,957,761 A | 9/1990 | Hale | |
| 4,978,542 A | 12/1990 | Buckley | |
| 5,110,609 A | 5/1992 | Lewis et al. | |
| 5,148,737 A | 9/1992 | Poulson | |
| 5,188,859 A | 2/1993 | Lodge et al. | |

(Continued)

FOREIGN PATENT DOCUMENTS

FR 2792810 11/2000

(Continued)

OTHER PUBLICATIONS

Dayna, Salad Recipes A to Z, Antipasto Pasta Salad,allrecipes.com.

*Primary Examiner* — Drew E Becker

(74) *Attorney, Agent, or Firm* — Brown & Michaels, PC

(57) ABSTRACT

The present invention provides an apparatus and method for cooking French fries without cooking oil. The apparatus relies on high pressure inert gas at high temperature as the cooking medium. The inert gas acts both as a heat transfer medium to cook the potatoes, and as a protective atmosphere to prevent charring and oxidation of the potatoes.

14 Claims, 2 Drawing Sheets

U.S. PATENT DOCUMENTS

| | | | |
|---|---|---|---|
| 5,204,133 A | | 4/1993 | Hibbs et al. |
| 5,312,635 A | | 5/1994 | Kazlas et al. |
| 5,372,830 A | | 12/1994 | Muller |
| 5,393,544 A | | 2/1995 | Hannah et al. |
| 5,395,634 A | | 3/1995 | Humphreys |
| 5,441,758 A | | 8/1995 | Lewis et al. |
| 5,505,975 A | * | 4/1996 | Taylor ............... 426/510 |
| 5,681,607 A | | 10/1997 | Maki et al. |
| 5,939,116 A | | 8/1999 | Ono |
| 5,994,672 A | | 11/1999 | Mestnik |
| 6,018,157 A | * | 1/2000 | Craft ............... 219/730 |
| 6,068,874 A | | 5/2000 | Grocholski |
| 6,389,958 B1 | * | 5/2002 | Ono ............... 99/330 |
| 6,463,794 B1 | | 10/2002 | Moshe et al. |
| 6,497,907 B2 | * | 12/2002 | Hofer ............... 426/233 |
| 6,626,088 B2 | * | 9/2003 | Ono ............... 99/330 |
| 6,796,223 B2 | | 9/2004 | Jiang |
| 7,008,659 B1 | | 3/2006 | Ono |
| 7,794,765 B2 | * | 9/2010 | Maguire ............... 426/233 |

FOREIGN PATENT DOCUMENTS

WO 9203064 A1 3/1992

* cited by examiner

METHOD AND APPARATUS FOR COOKING LOW FAT FRENCH FRIES

REFERENCE TO RELATED APPLICATIONS

This application is a divisional of U.S. patent application Ser. No. 11/939,811, filed Nov. 14, 2007, now U.S. Pat. No. 7,794,765 which is a continuation-in-part of U.S. patent application Ser. No. 10/349,278, filed Jan. 20, 2003, now abandoned, which claims priority to Australian patent application number 13553/02 filed Jan. 25, 2002, now abandoned. The aforementioned applications are hereby incorporated herein by reference.

BACKGROUND OF THE INVENTION

1. Field of the Invention

The invention pertains to the field of cooking. More particularly, the invention pertains to an apparatus and method for cooking foodstuff such as French fries in the absence of cooking oil.

2. Description of Related Art

The present invention is concerned primarily with the preparation of the side dish commonly known in the US as "French fries", or "fries" and in British English as "chips". Fries are distinguished from "potato chips" (or British potato crisps) by their shape, and by their method of production, distribution, and consumption. Fries are typically made from sections of raw or blanched potato that are larger than the thin slices from which potato chips are produced. Furthermore, fries are produced in small batches for hot consumption within minutes of preparation while potato chips are produced in much larger batches, or in a continuous process, and are packaged and distributed for later consumption at room temperature. The present invention is concerned with the production of French fries (hereafter referred to simply as "fries") rather than potato chips.

Fries are typically produced from prism shaped potato pieces. Normally, the prisms have cross sections of about ⅓ inch by ⅓ inch, but may range from about ⅙ inch by ⅙ inch to about 9/16 inch by 9/16 inch, their lengths normally range from about 1 inch to about 6 inches. Commonly, the fries are partially cooked, then frozen, transported, and stored, and final frying is performed shortly before consumption by immersing them for several minutes in cooking oil heated to 175° C. to 200° C.

Fries produced by this method absorb a significant quantity of the oil in which they are cooked and consequently have a high fat content that makes them a relatively unhealthy food. For reasons of improved health and nutrition it would be desirable to lower the fat content of French fries.

Previous attempts have been made to reduce the fat content of French fries. Approaches that have been tried include pre-cooking of the potato pieces prior to frying. Precooking can include blanching, microwaving or baking. Precooking reduces the amount of time the pieces must be submerged in cooking oil, and can therefore lower the fat content of the finished product. Various coatings have also been devised to try to limit the amount of oil absorbed onto the potato surface. Another approach involves cooking the potato pieces by microwave radiation, followed by spraying the surface of the pieces with hot oil (U.S. Pat. No. 4,978,542). All of these approaches still rely on oil to complete at least a portion of the cooking, and therefore still yield a product containing a substantial amount of fat.

There remains a need for a method suitable for the production of fat-free or low fat versions of French fries.

SUMMARY OF THE INVENTION

The present invention provides an apparatus and method for cooking French fried potatoes or other foodstuffs without the medium of cooking oil. The apparatus relies on high pressure inert gas at high temperature as the cooking medium. The inert gas acts both as a medium to cook the foods, and as a protective atmosphere to prevent charring and oxidation of the foods.

DETAILED DESCRIPTION OF THE INVENTION

Since gases have lower density than cooking oils, they give less effective heat transfer. To improve heat transfer in the gas, the present invention uses compressed inert gas at temperatures higher than can be maintained with cooking oil.

When cooking oils exceed a temperature limit known as their smoke point, they begin to decompose. This results in smoking and chemical break-down of the oil, and in extreme cases, even ignition of the oil. The decomposition of the oil may impart unhealthy chemical byproducts or undesirable flavors to the foods being cooked. In contrast, inert gases such as nitrogen, carbon dioxide, steam, or noble gases (helium, argon, neon, and xenon), can be heated to much higher temperatures without decomposition. While oil frying is limited to temperatures below about 200° C., the present invention utilizes an inert gas cooking medium heated typically to at least 180-250° C., but in some cases even 360° C. or higher. The temperature employed is limited by the vessel design and not by oxidization or chemical reaction of the cooking medium.

Increasing the pressure of a gas increases its density and improves its ability to transfer heat. Increased pressure in the cooking vessel also raises the temperature at which water in the potato pieces will boil. By increasing both the temperature and pressure of the inert gas, the present invention achieves timely adequate heating for "fast food fries" despite the lower intrinsic heat capacity of the gaseous cooking medium employed.

Because the present invention utilizes high pressure high temperature gas as the cooking medium, the cooking vessel employed differs from traditional cooking apparatus. Cooking under pressure is well known, but is typically limited to relatively modest pressures of 1-3 bar (15-45 psi). In contrast, the present invention is designed to operate at higher pressures. Typically pressures of 6-30 bar (90-435 psi) are employed, but may also range up to 100 bar (1500 psi) or even higher depending on the process.

Figure 1:
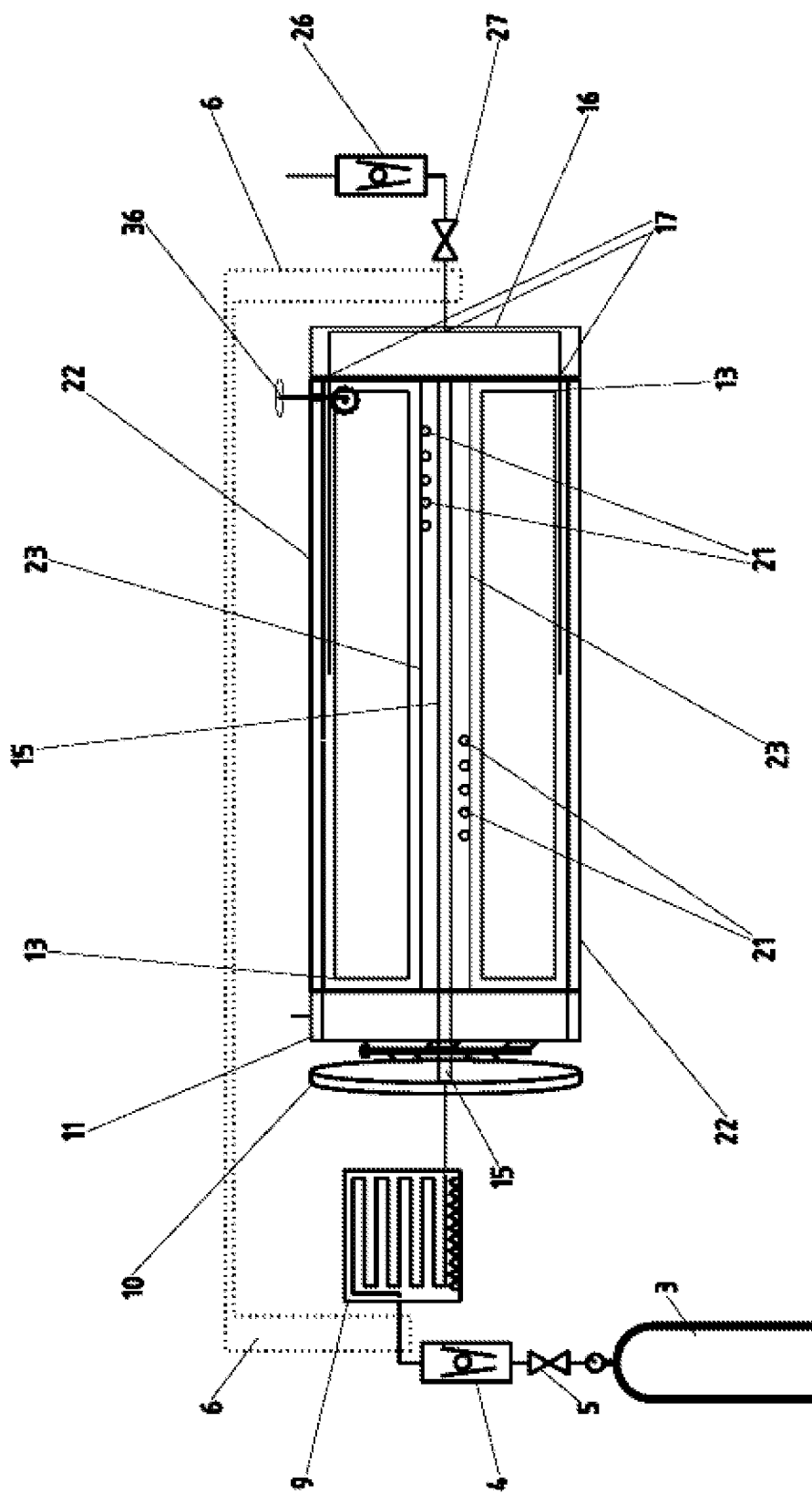
FIG. 1 shows a diagrammatic view of a cooking apparatus of the present invention.

One embodiment of a cooking apparatus suitable for present invention is illustrated in FIG. 1. The cooking apparatus 1 includes a cylindrical cooking chamber with side walls 22, an end wall 16 at one end, and a removable door 10 at the opposite end. The cooking chamber contains a removable annular cooking basket 13 which surrounds an axial heater 21. Axial heater 21 includes resistive heating elements contained within a perforated shell 23. A gas supply tube 15 is contained within and surrounded by the heating element 21.

Gas supply tube 15 has a plurality of small gas exit holes or is made of a porous material so that the gas is discharged evenly along its length. Coupled to gas supply tube 15 is a source of pressurized inert gas 3. The cooking chamber is optionally further coupled to a variety of control devices, sensors and transducers (described in more detail below) which allow the cooking process to be monitored and controlled.

Inert gas flows from pressurized inert gas source 3 through inlet control valve 5, flow meter 4, and optionally through a gas preheater 9. It then enters the chamber via tube 15. The gas flows out of tube 15 through axial heater 21, over the contents of the annular basket 13, and finally exits the cooking chamber via gas exits 17. The inert gas source 3 may optionally consist of an array of several different gasses, thereby giving the user the option of applying different gases or mixtures of gases to the cooking process.

A high pressure is maintained within the chamber during cooking. This pressure may be maintained and controlled by any means well known in the art, but is preferably controlled by a combination of regulating the flow rate of inert gas into the chamber (inlet control valve 5), and regulating the flow rate of gas exiting the chamber (exit flow control 27). Preferably, gas flowing into the chamber enters from a pressure higher than the desired pressure in the cooking chamber, and the gas exit flow control 27 includes a pressure regulator that can be set to maintain a desired cooking pressure by allowing gas to exit the chamber whenever the pressure within the chamber exceeds the desired value.

Figure 2:
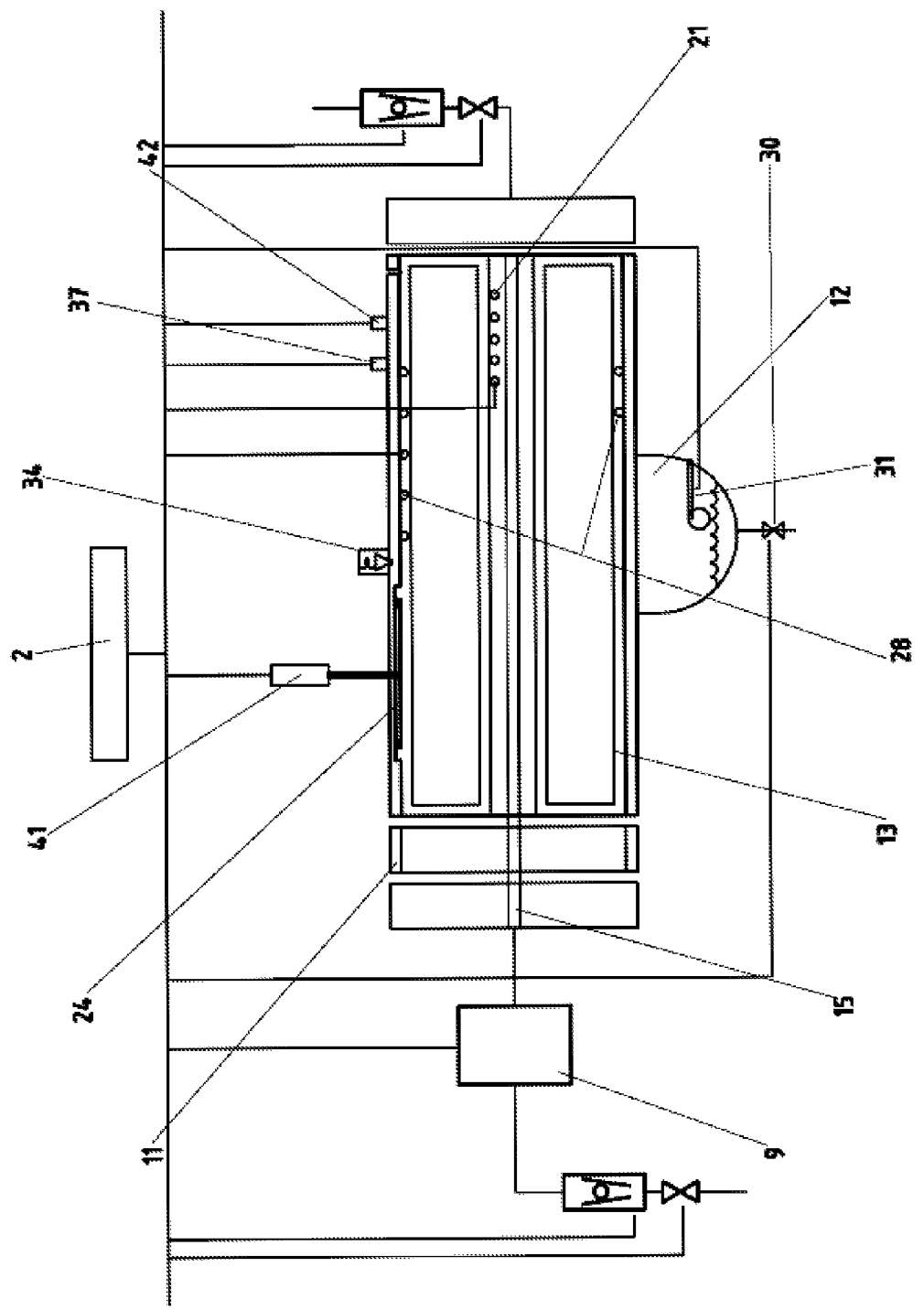
FIG. 2 shows further detail of a cooking apparatus of the present invention.

This arrangement can allow a steady stream of inert gas to flow through the chamber—the outflow from the chamber consisting of a flow equal to the inflow of inert gas plus any additional gas such as water vapor generated or liberated in the cooking process. An optional exit gas flow meter 26 can be included to monitor the flow rate of gas out of the cooking chamber. The flow and pressure controls that regulate the pressure within the chamber can be coupled to the control apparatus 2 shown in FIG. 2 and as described in more detail below. Control apparatus 2 can, in cooperation with pressure transducer 37, control the pressure in the chamber and may optionally provide variable time-pressure profiles during a cooking sequence. As an additional safety feature, the cooking chamber may include a pressure relief valve 34. This valve allows gas to be released in the case of an unexpected pressure build up within the chamber and is preferably set to open at a pressure higher than the cooking pressures used in the chamber, but lower than the safe pressure limit of the apparatus.

Heat is provided to the cooking chamber by any of several means. A first source of heat is provided by an optional gas preheater 9 that is located outside the cooking chamber and heats the inert gas before it enters gas feed tube 15. A second heat source is the axial heater 21 located within the chamber. A third heat source is provided by the optional periphery heater 28. If needed, an additional external heat source (not shown) can be applied to the outer surfaces of cylinder side walls 22. The heaters 9, 21, and 28 can act in cooperation with the control apparatus 2, which can use feedback from temperature transducer 42 to control the temperature within the chamber during a cooking sequence.

In order to produce a palatable and consistent cooked product with the apparatus, it is desirable to accurately control the cooking process. This can be achieved by a variety of means. In its simplest form, the apparatus can be operated manually with the temperature and pressure within the chamber being controlled by a simple means such heater switches or thermostats and manual valves or pressure regulators. Output flow rate can be controlled by a manually set valve. The duration of cooking in such an arrangement can be controlled by a timer, or by simply allowing an appropriate interval of time to pass before manually ceasing the cooking phase.

In more sophisticated embodiments of the invention, one or more of the cooking parameters can be automatically controlled based on feedback from measurements of conditions in the cooking chamber. For instance, the apparatus can include one or more transducers measuring parameters such as pressure, temperature, humidity, and moisture content. Measurements may be made of one or more of the atmosphere within the chamber, the gases entering and exiting the chamber or of the potato pieces being cooked. Data outputs from any of these transducers can then be employed to automatically control the cooking conditions. Control of the cooking conditions can be achieved by regulating one or more of: the identity, flow rate, pressure, or temperature of the gas entering the chamber; the heat applied to the chamber, the pressure of the gas within the chamber; the temperature within the chamber; and the time and rate at which any changes in these parameters occur. The control apparatus can manipulate these parameters by being actively coupled to heaters, flow control valves, pressure regulators, switching valves and other similar devices typically employed for process control. Optionally, the controller can change these parameters in a time-dependent fashion to provide a cooking sequence with specific time profiles of temperature, pressure, and gas composition. Alternative embodiments of the apparatus include transducers that monitor additional parameters such as the weight of the apparatus, acoustic activity within the chamber, and the electromagnetic propagation characteristics of the potato pieces. Monitoring such parameters can provide a basis for determining the degree to which the potatoes have been cooked and can be used to determine when to stop a cooking sequence or a phase thereof since each of these parameters may change over time as cooking proceeds. The control apparatus to perform these functions can consist of dedicated process controllers such as temperature controllers, pressure controllers and timers, or can consist of integrated microprocessor based controllers, alternatively, the control apparatus could be implemented by software running on one or more process monitoring and controlling computers.

In order to further perfect the properties of foodstuffs cooked using the present invention, additional optional features may be included in the apparatus and method. One such optional feature is a means to admit a controlled amount of air or oxygen during at least a part of the cooking phase. Though it is desirable to maintain a substantially inert atmosphere within the cooking chamber during cooking, it may be also be desirable to admit a small controlled amount of oxygen at certain times during cooking to allow surface browning of the fries. This may be achieved either by bleeding a controlled amount of air or oxygen into the stream of inert gas entering the chamber, or by providing a separate gas inlet coupled to a source of compressed air or oxygen. In either case, the air or oxygen input is preferably coupled to a control valve to regulate the amount of oxygen entering the system.

A second optional feature is a steam inlet. Steam, by virtue of its tendency to condense on cool objects, is a more effective heat transfer medium than non-condensing inert gases such as nitrogen or carbon dioxide. A portion of the cooking sequence may involve the introduction of steam or superheated steam to the chamber. Initially, the steam would condense on the cool food pieces and thereby provide rapid initial heating from cold or ambient to cooking temperature.

A third optional feature, is the addition of a pooling sump 12 to the cooking chamber. The sump is located at the bottom of the chamber and collects any liquids that are produced or condensed during the cooking process. The sump may include a level sensor 31, and a bleed valve 30 for draining the contents of the sump. Liquid water so drained does not incur heat waste on re-vaporization, which would be unavoidable if it were not removed.

A fourth optional feature is the addition of a heat exchanger 6 to capture heat from the stream of gas exiting the chamber. Such a heat exchanger may be of any design known to the art, and may include a provision for condensing steam in the exit stream to liquid water. One advantageous arrangement uses a heat exchanger to recover heat from the gas exiting the chamber and re-uses it to heat the gas stream entering the chamber.

A fifth optional feature is the inclusion of a means 36 to rotate the cooking basket 13 within the cooking chamber. Rotation during cooking is advantageous since it ensures that the potato pieces are uniformly heated and prevents uneven overheating by prolonged lopsided exposure.

A second embodiment of the present invention provides a method for cooking fries in the absence of cooking oil. This method is practiced using the apparatus described above and includes the following steps.

1) A batch of potato pieces (of dimensions as described above) is placed into the cooking basket.
2) The basket is inserted into the cooking chamber and the chamber is sealed so that it can be pressurized.
3) The chamber is pressurized with inert gas to an elevated pressure.
4) Heat is applied to the cooking chamber.
5) The flow of gas into and/or out of the chamber are adjusted to control the pressure and the rate at which water vapor is carried from the cooking chamber.
6) A positive flow of inert gas is maintained through the chamber during the cooking phase so that water evolved from the cooking potatoes is removed from the cooking chamber with the flow of gas.
7) When the potato pieces have been cooked to a desired degree, the chamber is depressurized, optionally cooled, and opened to remove the cooked potato pieces.

Preferably, the elevated pressure during the cooking steps is maintained between about 6 bar (90 psi) and about 100 bar (1500 psi). More preferably, the pressure is maintained between about 6 bar and about 30 bar (90-435 psi). The heat required for the cooking step may be applied through one or more of the gas preheater, the axial heater and the peripheral heater as required. During the main cooking phase, during which the majority of water is removed from the potato, the chamber temperature plateaus at the boiling temperature of the water. Assuming pure water, boiling at 180° C., 200° C., or 220° C. occurs at chamber pressure of 10, 15.5, or 23 Bar (150 psi, 225 psi or 335 psi) respectively. Effective heat reaches the potato with its still contained water. Heat spent on raising the temperature of vapor after liberation from the potato and preceding only exhaust from the chamber is wasted.

During this phase, the main effect of varying the heating power will be variation in the rate of vaporization and evolution of water vapor. The temperature will scarcely vary at all, over a wide range of heating power variation. If heating is pursued to 100% dehydration then further continued, the temperature of the potato will rise rapidly with time, above the water boiling temperature.

In order to produce fries with desirable features, and to provide a process suitable for fast-food environments, additional optional steps may be included in the method.

One such optional step involves preheating the potato pieces with superheated steam. Preheating with superheated steam can shorten the heating period required to bring the potato pieces up to cooking temperature. Admission of steam causes water vapor to condense onto the cold potato pieces, and the overall cooking time can be reduced by several tens of seconds.

A second optional step is the addition of a searing phase to further dry and crisp the surface of the potato pieces. This step is preferably added after the main cooking period. During this searing phase, the pressure in the cooking chamber is increased and the gas flow is decreased, (which stops the boiling and opposes the outflow of water from the interior of the potato pieces) and the temperature is increased (which further dries the surface layer of the chips). A dry, crispy surface layer is thus produced which penetrates a little way into the surface of the potato. This provides a delay against a rapid and undesirable sogging of the cooked potato pieces.

A third optional step includes a browning phase added after the main cooking phase. Browning is achieved by allowing some oxygen into the cooking chamber while the chips are still hot, or are still being heated. This causes browning of the chips by partial oxidation. If desired, this can step be performed concurrently with a searing phase, taking advantage of the reduced outflow and increased temperature, or it can be performed as a separate step.

A fourth optional step includes slowing the rate of cooking for at least a portion of the cooking sequence. During the main cooking phase, the pressure and heat flow are manipulated to achieve a fine control over the boiling rate, which can thereby be adjusted from full rate boiling and vapor evolution down to a gentle simmer This limits the internal explosive and disintegrative nature of the cooking caused by violent boiling allowing reduced gelatinization and disintegration of the potato, hence a lower glycemic index (GI), at the expense of longer cooking times. An acoustic sensor (24 and 41) can be used to measure more precisely the boiling rate, and allow more precise control of it. This method of cooking could be characterized as "double time" or "triple time" or "quadruple time", according to the amount of slowdown of the main cooking phase. "Double time" and maybe even "triple time" might still be suitable for use in some fast food environments. Maybe, if salable, as an up market classier healthier option. Some kitchens catering for patients with special dietary needs may for the first time be able to offer low GI fries, hitherto unavailable.

A fifth optional step includes introducing additives to the French fries after cooking. This could include the addition of trace amounts of oil or other fats to improve the flavor of the fries, or the addition of coloring agents to improve their appearance. Other flavoring substances such as salt and spices as are typically added to French fries could also be added. Additional fluid can mitigate the greater dryness employed to delay sogging.

While the examples above focus on the preparation of French fries, it will be understood that the methods and apparatus disclosed can also be applied to other foodstuffs. Accelerated cooking at higher temperatures rendered non-burning by the absence of oxygen is applicable to food other than potato and to cooking other than 'fast food'. For example using the present method with positive pressurized inert oxygen free gases, pizzas can be cooked at higher temperatures without burning, bringing the cooking time down from the 15 to 20 minutes now needed to cook from raw ingredients, to around five minutes. Other vegetables similar to potato, like pumpkin, sweet potato, can be quickly cooked, or cooked with a lower glycemic index, with essentially the present method.

The cooking methods disclosed herein can be entirely sub-boiling, with no boiling at all. Just below but strictly below trapped water boiling temperature cooking allows purely evaporative, non-boiling cooking. This feature can minimize disintegration and gelatinization and, because of the high temperature, for example 200° C., the cooking is still reasonably quick. For example, it takes around 2-3 hours to properly cook a large roast, and this cannot be accelerated by higher temperatures because it will burn; using the present methods, higher temperatures can be used without fear of burning, and the cooking time can be reduced. Accordingly, because of the absence of oxygen, many types of food can be cooked in a shorter time using higher temperatures.

In all cases, the oven would be pressurized, but the pressure could range down to a low value in some cases—for example, a pizza oven more or less as existing now, could have inert gas piped into its centre, establishing an outflow—all ovens seal reasonably well, and a low positive internal pressure, after a purge, can keep the cooking atmosphere free from oxygen throughout the cooking.

EXAMPLES

The specific examples of the method described below are indicative of the operation of the invention, but are not intended to limit the scope of the method which is described in the included claims.

Example 1

228 g (8 oz.) of potato pieces are loaded into the cooking basket and placed in the cooking chamber. The chamber is sealed and pressurized to 10 bar (145 psi) by admitting nitrogen gas to the chamber via the gas feed tube.

The interior of the chamber is heated by applying at least 1.4 kW of heat via the axial gas heater (optionally in combination with the peripheral heater and/or the gas preheater if present) and the temperature of the potato pieces is monitored with a temperature transducer.

After approximately 68 seconds, the temperature of the potato pieces reaches 175° C., (just below the temperature at which water will begin to boil at 10 bar), the exhaust valve is set so that gas leaves the chamber at a rate of 2 g per minute, or, for nitrogen, one third of a liter per minute at 10 Bar and 175° C. The inlet valve is adjusted to maintain the internal pressure at 10 Bar, by replenishing the chamber gas.

The heating is continued and when the chips reach 180° C., their water starts to boil and water vapor appears in the chamber, evolving from the surface of the chips. As the evolution of water vapor from the chips increases, the exhaust valve is adjusted to allow the outflow of both the inert gas and the evolved water vapor, whilst maintaining the chamber pressure at 10 Bar. Water vapor is continually removed from the chamber by the flow through the gas outlet.

228 g (8 oz) of raw potato contains about 150 g (5.3 oz) of water, which produces 30 L of vapor at 180° C. and 10 Bar. For the chips to reach 85% dehydration in 3 minutes, 8.3 L per minute of water vapor, plus the inert gas flowing into the chamber, needs to be exhausted from the chamber.

After approximately 3 minutes, the chips reach the desired 85% dehydration. Heating is ceased, the chamber is depressurized, cooled if necessary to prevent unwanted oxidization, browning or charring, opened, and the chips are removed.

The moisture content of the chips may be determined by one or more of
a) the passage of an appropriate time interval;
b) the measurement of residual moisture in the chips;
c) the measurement of accumulated exhaust moisture and inference of residual moisture in the chips, whose initial quantity was known; and
d) the integration of a moisture outflow rate and inference of residual moisture in the chips, whose initial quantity was known;

Example 2

Cooking is performed as in Example 1, but preheating is done with superheated steam, to shorten the initial 68 second heating period, superheated steam is fed into the chamber through the steam manifold 11 and the temperature of the potato pieces is monitored as described above. When the temperature of the potato pieces reaches 175° C. the gas inlet is switched to nitrogen and the cooking proceeds as above.

In this example, the water vapor condenses onto the cold chips bringing them up to temperature more quickly than the nitrogen gas in Example 1. Therefore the primary cooking phase can commence earlier, and overall time in the chamber can be reduced by several tens of seconds—68 seconds might be reduced to less than 30 seconds, or even less, if the superheated steam on standby is released from a stored reservoir.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An apparatus for cooking foodstuff in a pressurized flow of hot inert gas in the absence of added fats comprising:
    a) a sealable cooking chamber having a sealable opening, a gas inlet, and a gas outlet;
    b) a holder for containing the foodstuff sized to fit within the cooking chamber;
    c) a gas heater coupled to a source of a pressurized inert gas and to the gas inlet;
    d) a pressure sensor;
    e) a pressure regulator coupled to the pressure sensor for maintaining a selected pressure within the sealable cooking chamber;
    f) a temperature sensor; and
    g) a temperature controller coupled to the temperature sensor and to at least one of the gas heater and the source of pressurized inert gas
    wherein a flow of hot inert gas during operation of the apparatus is maintained by the pressure regulator at a chamber pressure above 6 bar, and by the temperature regulator at a temperature between 160° C. and 360° C.

2. The apparatus of claim 1, further comprising an inlet for the controlled admission of an oxygen-containing gas to the cooking chamber.

3. The apparatus of claim 1 further comprising a moisture sensor for measuring the moisture content of one or more of:
    a) a surface of the foodstuff;
    b) an interior of the foodstuff;
    c) a gas inside the sealable cooking chamber; and
    d) a gas exiting the sealable cooking chamber.

4. The apparatus of claim 1, further comprising an acoustic sensor to detect sounds generated by the foodstuff during cooking.

5. The apparatus of claim 1, further comprising a second heat source for heating the cooking chamber.

6. The apparatus of claim 1, further comprising a rotisserie for rotating the holder within the cooking chamber.

7. The apparatus of claim 1, further comprising a heat exchanger coupled to the gas outlet.

8. The apparatus of claim 7, wherein the heat exchanger is coupled to the source of pressurized inert gas such that heat is exchanged between a hot gas leaving the gas outlet and the pressurized inert gas before the pressurized inert gas enters the gas heater.

9. The apparatus of claim 1, further comprising a control apparatus having at least one data input and at least one output for controlling a cooking parameter.

10. The apparatus of claim 9 wherein the data input is selected from the group consisting of:
    a) an elapsed time from a timer;
    b) a temperature from the temperature sensor;
    c) a moisture level from a moisture sensor;
    d) a pressure from the pressure sensor; and
    e) a combination of two or more of (a) through (d).

11. The apparatus of claim 9 wherein the cooking parameter is at least one of a pressure in the cooking chamber, a temperature in the cooking chamber, and a duration of cooking, and the control apparatus controls the cooking parameter by manipulating at least one of a heat input to the chamber, a flow of pressurized inert gas into the chamber, a flow from the chamber, and a pressure within the chamber.

12. The apparatus of claim 1, wherein the heater is located within the sealable cooking chamber.

13. The apparatus of claim 1, wherein the pressurized inert gas is selected from the group consisting of:
    i) nitrogen;
    ii) carbon dioxide;
    iii) steam;
    iv) a noble gas; and
    v) a mixture of two or more of (i) through (iv).

14. The apparatus of claim 1, further comprising a heat source within the chamber, a moisture sensor within the chamber, a rotisserie within the chamber, and a control apparatus.

* * * * *